2,919,984
BRAZING ALLOY

Rene D. Wasserman, Stamford, Conn., and Joseph F. Quaas, Island Park, N.Y., assignors to Eutectic Welding Alloys Corporation, Flushing, N.Y., a corporation of New York No Drawing. Application April 16, 1959
Serial No. 806,784

3 Claims. (Cl. 75—151)

This invention relates to a new brazing alloy, and more particularly to a brazing alloy incorporating a major amount of cadmium and minor amounts of silver and zinc.

Brazing alloys incorporating major amounts of cadmium and minor amounts of silver and zinc have been utilized, for example, for brazing aluminum, copper and steel; and they are most widely used, for example, as filler alloys for these materials. This type of alloy, however is notorious for its poor peel and shear strength on copper, particularly at elevated temperatures.

U.S. Letters Patents 2,781,577 and 2,087,716 describe alloys of this general type, and they accordingly, do not describe or suggest any compositions having an exceptional shear and peel strength upon copper.

An object of this invention is to provide a brazing alloy whose shear strength and resistance to peeling on copper are relatively high even at elevated temperatures.

In accordance with this invention, a novel brazing alloy incorporates from 90 to 94% cadmium; 4 to 5% silver; and from 3 to 4.75% zinc. This alloy demonstrates relatively high shear strength values when used as a filler alloy on copper and copper alloy parent materials, both at ambient and elevated temperatures; and it demonstrates remarkable resistance to peeling at both ambient and elevated temperatures when applied to copper and copper alloys. Its shear strength on aluminum and steel is surprisingly adequate despite its relatively great zinc content.

A particularly advantageous alloy composition within this invention, referred to herein as "optimum" alloy, incorporates its constituents in the ranges as follows:

| Constituents: | Percentages by weight |
|---|---|
| Cadmium | 91.60 |
| Silver | 4.62 |
| Zinc | 3.78 |
| Total | 100.00 |

This alloy, when applied as a filler metal to copper and steel parent materials displays an unusually high shear strength. On copper, for example, its shear strength under test of 9400 pounds/sq. in., has been demonstrated; and on steel it displays a shear strength of 13,500 pounds/sq. in. Tests have also been made comparing the physical properties of this alloy with a standard alloy containing, for example, 95% cadmium and 5% silver. This standard alloy is widely known and is in widespread commercial use as a filler alloy for application on aluminum, copper and steel.

Test specimens were prepared of the aforementioned alloy of this invention utilizing strips of copper and steel 5 inches long by 1 inch wide by ⅛ inch thick. A lap joint was prepared using a ⅜ inch overlap on the 1 inch face and a gap clearance of 0.003 inch. Both the standard 95/5 alloy and the aforementioned alloy of this invention were used as filler materials in brazing the aforementioned shear strength specimens. Table 1, as follows, shows the results of these tests:

| Testing Temperature, °F. | Parent Material | 95/5 Alloy, p.s.i. | Optimum alloy, p.s.i. |
|---|---|---|---|
| 70 | Copper | 8,000 | 9,500 |
| 70 | Steel | 11,900 | 12,500 |
| 150 | Copper | 4,700 | 6,800 |
| 200 | Steel | 8,500 | 8,000 |
| 250 | Copper | 3,800 | 5,500 |
| 300 | Steel | 6,000 | 5,500 |
| 350 | Copper | 3,500 | 3,500 |
| 400 | Steel | 3,900 | 3,300 |
| 500 | Copper | 2,500 | 1,500 |

Table 1 demonstrates that the optimum alloy of this invention shows unusually high shear strengths up to 250° F. when used on copper parent materials. Furthermore, the 95/5 alloy is notorious for poor peel strength on copper whereas an alloy in accordance with this invention exhibits remarkably high ductility and extremely high resistance to peeling upon copper. It is noted that with the exception of room temperatures when used upon steel parent materials, the alloy of this invention is not as good as the 95/5 alloy, and the principle utility of this novel alloy is, therefore, for a high strength filler alloy on copper and copper base parent alloy materials for use at ambient as well as elevated temperatures. According to standard metallurgical theory, one would assume that the alloy of this invention would be completely unsatisfactory to use with steel parent materials because the zinc content should form a brittle interface which would make its shear strength extremely poor. However, the tests recorded in Table 1 indicate that even when used with steel this novel alloy provides useful results even though shear strengths are not quite as high as those provided by the standard 95/5 alloy. This novel alloy, therefore, has the advantage of capability of satisfactory use with steel as well as providing remarkably advantageous properties in conjunction with copper and copper alloys.

Other alloy compositions within this invention, as well as optimum alloy "B," together with their shear strengths on copper and steel are, for example, described in the following tabulation:

|  | Percent By Weight | | | Shear Strength #/in.² | |
|---|---|---|---|---|---|
|  | Cadmium | Silver | Zinc | Copper | Steel |
| Alloy A | 92.1 | 4.80 | 3.10 | 9,100 | 13,250 |
| Alloy B | 91.6 | 4.62 | 3.78 | 9,400 | 13,500 |
| Alloy C | 90.6 | 4.75 | 4.65 | 9,200 | 13,250 |

What is claimed is:

1. A brazing alloy consisting essentially approximately in the following ranges of percentages by weight:

| | Percent |
|---|---|
| Cadmium | 90 to 94 |
| Silver | 4 to 5 |
| Zinc | 3 to 4.75 |

2. A brazing alloy consisting essentially approximately in the following ranges of percentages by weight:

| | Percent |
|---|---|
| Cadmium | 90.50 to 92.10 |
| Silver | 4.75 to 4.80 |
| Zinc | 3.10 to 4.65 |

3. A brazing alloy consisting essentially in percentages by weight of:

| | Percent |
|---|---|
| Cadmium | 91.60 |
| Silver | 4.62 |
| Zinc | 3.78 |

References Cited in the file of this patent

FOREIGN PATENTS 644,436   Great Britain _____ Oct. 11, 1950